Figure 1:
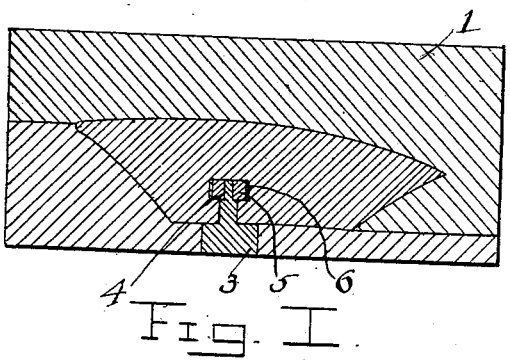

No. 859,335.

PATENTED JULY 9, 1907.

J. RAMSPERGER.
METHOD OF FASTENING PINS IN ARTIFICIAL TEETH.
APPLICATION FILED NOV. 8, 1906.

Witnesses
J. C. Simpson
J. W. Zuinn

Inventor
Joseph Ramsperger
By
Attorneys

UNITED STATES PATENT OFFICE.

JOSEPH RAMSPERGER, OF YORK, PENNSYLVANIA.

METHOD OF FASTENING PINS IN ARTIFICIAL TEETH.

No. 859,335.

Specification of Letters Patent.

Patented July 9, 1907.

Application filed November 8, 1906. Serial No. 342,519.

*To all whom it may concern:*

Be it known that I, JOSEPH RAMSPERGER, a citizen of the United States, residing at York, in the county of York, State of Pennsylvania, have invented certain new and useful Improvements in Methods of Fastening Pins in Artificial Teeth; and I do hereby declare the following to be a full, clear, and exact description of the invention, such as will enable others skilled in the art to which it appertains to make and use the same.

This invention relates to improvements in the method and manner of securing dowel pins in artificial teeth.

It has been found in practice that a dowel pin cannot be made to stay in an ordinary straight hole for the reason that the friction is not sufficient and if the fit is made sufficiently close to insure against the pin pulling out, then there is danger of cracking the tooth in forcing the pin into place. Various methods have been proposed for securing the pins by soldering them to plates baked into the teeth, but such plates must be of platinum because of the necessity of refractoriness and prevention of discoloration of the teeth. Platinum plates are expensive and in a factory where millions of teeth are manufactured in a year, the aggregate expense is enormous. It has been found that the best method for holding the pins in the teeth is to enlarge the inner end of the holes or recesses that receive the pins and then provide the pins with heads that fill the enlargements. It is desirable that the heads of the pins be of solder because of the cheapness of the material and of the operation. It is found in practice, however, that a simple inwardly enlarged cavity in a porcelain tooth cannot be filled with solder as a head for a pin for the reason that the solder when melted, instead of flowing into close contact with the wall of the enlargement, clings to the pin and follows along it outwardly of the recess. It has been proposed to line the recess and its enlargement with an inwardly expanded platinum tube, but both the material and the process are expensive. Such a lining has for its object to provide a metal surface to which the solder will cling so that the enlargement may be filled with solder.

The object of the present invention is to provide a method wherein the enlarged portion of an inwardly enlarged pin receiving recess in a tooth will be provided with a thin metal lining to which the melted solder will flow and cling and by which it will be held within the enlargement of the cavity to completely fill the cavity while uniting with the pin to form a head for the pin so that the pin will not depend upon the metal lining for being held in the tooth but will be held securely by its solder head.

Figure 4:
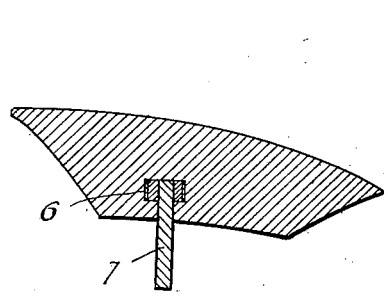
Figure 2:
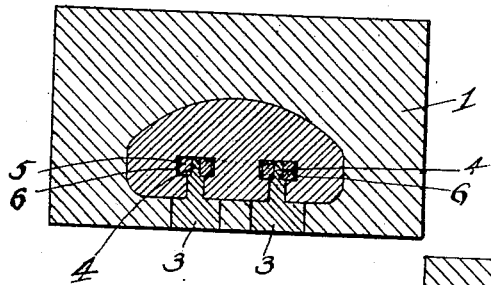
Figure 6:
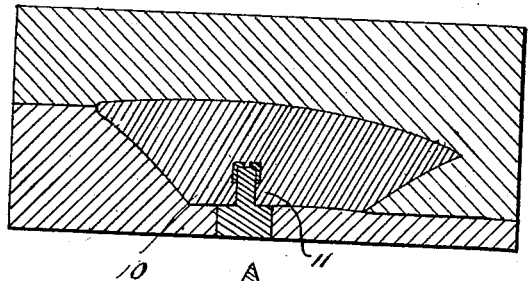
Figure 3:
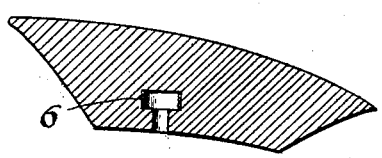

In the drawings—Figure 1 is a longitudinal section through a tooth ready for baking with the core pin having its combustible head in place and surrounded by a short tube or ribbon of platinum or other refractory metal. Fig. 2 is a transverse section through the tooth showing the two core pins and accompanying parts. Fig. 3 is a longitudinal section through the tooth with the lining in place and ready for the pin. Fig. 4 is a view similar to Fig. 3 showing the complete tooth with the pin in place. Fig. 5 is a view similar to Fig. 1 showing a lining for the enlarged portion flush with the minor portion of the cavity, and illustrating the process. Fig. 6 is a view similar to Fig. 4 showing a complete tooth flush with the minor portion of the cavity.

Referring now to the drawings, 1 designates a common form of mold for forming a false tooth. In Fig. 1 of the drawings there is shown a core pin 3 projecting from one member of the mold, the free end of which pin is slightly reduced in diameter as shown at 4 to receive a head 5. In practice, two such core pins are employed to form two recesses as illustrated in Fig. 2 of the drawings. The head may be made of wood or paper or other combustible material and has a diameter slightly greater than the major diameter of the pin. In the present process, the periphery of the head is provided with an encircling tube or band 6 of platinum or other refractory metal. After the core pin has been thus equipped, the plastic material for the tooth proper is placed in the mold and after having the tooth "bisquitted" it is removed from the mold. The heat incident to the subsequent baking burns out the combustible head of the core pin so that the tooth is provided with a recess or recesses, as the case may be, each recess being inwardly enlarged or enlarged at its inner end, the enlarged portion being provided with a lining of metal. The metal is preferably platinum, although it may be of some other refractory metal. The combustible head of the core pin being of greater diameter than the major portion of the pin, the inner end portion of the cavity is of greater diameter than the outer end portion notwithstanding its metal lining.

A tooth thus produced may have a pin or pins 7 soldered into its cavity or cavities in any desired manner such as by dropping a small particle of solder into each cavity, then placing the pin in the cavity to rest upon the solder and then subjecting the entire tooth with its pin and solder to sufficient heat to melt the solder and cause it to unite with the pin and fill up the enlarged portion of the cavity either uniting continuously or not with the metal lining of the enlarged portion of the cavity as shown at 12.

The advantages in this particular method are that it results in an article wherein the platinum is reduced to a very small quantity, being only about one-half the length as when a tube is used reaching from the bottom of the cavity to the face of the tooth. Furthermore, by this process is provided a tooth wherein the platinum does not necessarily act as an anchor for the pin but merely provides a lining for the enlargement of the cavity that has an affinity for solder so that the solder 12 while uniting with the pin 7 to form a head will flow to the lining and completely fill up the enlargement of the cavity and thus hold the pin securely through the medium of the head alone, if necessary. It is not necessary that the lining be absolutely fixed in the tooth as is the case where the tube acts as an anchor. The process in fact is a mere modification of the process described in a copending application filed November 1, 1905, Serial Number 285,417.

Referring now to Figs. 5 and 6 of the drawings, there is illustrated a modification of the process, wherein there is employed a tube or ribbon 10 which is disposed upon a core pin 11 of constant diameter. The tube may have its upper end slightly turned inwardly to prevent it from dropping down on the pin during the molding process. No combustible head is employed in this modification but instead, the tube when finally baked into the tooth, has its inner surface flush with that portion of the recess or cavity between the tube and the face of the tooth. The tube in this case acts purely and simply as an anchor for the pin 13 by reason of the fact that when the tube is within an under-cut or enlarged portion of the cavity, it cannot by any possible means be withdrawn so that a pin soldered to the tube is of necessity absolutely fixed in place. It will be noted that in a tooth constructed in this manner, the softness of the platinum is of no disadvantage for the reason that there is no such strain upon the platinum as could possibly cause it to draw to a reduced diameter. On the contrary, the end of the tube sets flat against a square shoulder and no movement of the tube in any direction is possible whether the tube be entirely filled with the solder or not.

What is claimed is :

1. The method of preparing an artificial tooth for the reception of a pin which consists in incorporating within the tooth while in a plastic state a core of such dimensions as to produce an inwardly enlarged cavity, the portion of the core forming the enlargement of the cavity being of combustible material provided upon its exterior with an encircling sheet of refractory metal and afterwards baking the tooth at a temperature sufficient to consume the combustible mass.

2. The method of preparing a tooth for the reception of a pin which consists in incorporating within the tooth during the molding operation, a core including a terminal enlarged combustible portion having an encircling sheet of metal, whereby an inwardly enlarged recess will be produced, and then subjecting the tooth to a temperature sufficient to burn out the combustible body and bake the sheet of metal into the enlarged portion of the recess.

3. A method of preparing an artificial tooth with an inwardly enlarged cavity having its enlarged portion only provided with a metal lining, which consists in incorporating within the tooth, during the molding operation, a cavity-forming core having a combustible enlarged terminal provided upon its exterior with the metal lining and afterward baking the tooth at a temperature sufficient to consume the combustible matter and thereby leave the lining against the wall of the enlarged portion of the cavity formed by the enlarged combustible terminal of the core.

4. A method of fastening a pin into an artificial tooth which consists in incorporating within the tooth during the molding operation, a cavity-forming core having a combustible enlarged terminal provided upon its exterior with a metal lining and afterward baking the tooth at a temperature sufficient to consume the combustible matter and thereby leave the lining metal against the wall of the enlarged portion of the cavity formed by the enlarged combustible end portion of the core, and then soldering a pin to said lining.

In testimony whereof, I affix my signature, in presence of two witnesses.

JOSEPH RAMSPERGER.

Witnesses :
DAVID L. F. SHULTZ,
A. J. BRENNEMAN.